(12) United States Patent
Green et al.

(10) Patent No.: US 12,553,032 B2
(45) Date of Patent: Feb. 17, 2026

(54) METHOD FOR PRODUCING ERYTHROID CELLS

(71) Applicant: NHS BLOOD & TRANSPLANT, Bristol (GB)

(72) Inventors: Carole Green, Epsom (GB); Vanja Crew, Bristol (GB); Nicole Thornton, Bristol (GB); Louise Tilley, Bristol (GB); David Anstee, Bristol (GB)

(*) Notice: Subject to any disclaimer, the term of this patent is extended or adjusted under 35 U.S.C. 154(b) by 871 days.

(21) Appl. No.: 17/291,105

(22) PCT Filed: Oct. 31, 2019

(86) PCT No.: PCT/GB2019/053102
§ 371 (c)(1),
(2) Date: May 4, 2021

(87) PCT Pub. No.: WO2020/095029
PCT Pub. Date: May 14, 2020

(65) Prior Publication Data
US 2021/0403867 A1 Dec. 30, 2021

(30) Foreign Application Priority Data
Nov. 5, 2018 (GB) .................................. 1818045

(51) Int. Cl.
*A61K 35/18* (2015.01)
*C12N 5/078* (2010.01)
*C12N 15/113* (2010.01)

(52) U.S. Cl.
CPC ............ *C12N 5/0641* (2013.01); *A61K 35/18* (2013.01); *C12N 15/1138* (2013.01); *C12N 2501/599* (2013.01)

(58) Field of Classification Search
None
See application file for complete search history.

(56) References Cited

U.S. PATENT DOCUMENTS

| | | | |
|---|---|---|---|
| 2007/0218552 A1 | 9/2007 | Giarratana et al. | |
| 2011/0086424 A1* | 4/2011 | Lanza | C12N 5/0647 435/325 |
| 2014/0024118 A1 | 1/2014 | Riken et al. | |
| 2014/0377237 A1* | 12/2014 | Frayne | C12N 5/0641 435/325 |
| 2017/0037373 A1 | 2/2017 | Baek et al. | |
| 2019/0201548 A1* | 7/2019 | Kahvejian | A61K 35/18 |

FOREIGN PATENT DOCUMENTS

| | | |
|---|---|---|
| CN | 107201338 | 9/2017 |
| KR | 20100081678 | 7/2010 |
| KR | 20130055313 | 5/2013 |
| KR | 20140011912 | 1/2014 |
| WO | 2006085482 A1 | 8/2006 |
| WO | 2010/009807 | 1/2010 |
| WO | 2013/104909 | 7/2013 |

OTHER PUBLICATIONS

Lambert et al(The International Journal of Biochemistry & Cell Biology 41 (2009) 1102-1115, doi: 10.1016/j.biocel.2008.10.017, Oct. 25, 2008) (Year: 2008).*
Fumoto et al (Expert Opinion on Therapeutic Targets, 13:7, 811-822, DOI: 10.1517/14728220902988549, May 26, 2009) (Year: 2009).*
Nii et al (Experimental Hematology 2015;43:901-911, http://dx.doi.org/ 10.1016/j.exphem.2015.06.001) (Year: 2015).*
Lacy et al (Cold Spring Harb Mol Case Stud 2: a000885, 2016, doi: 10.1101/mcs.a000885) (Year: 2016).*
Gao et al (Blood First Edition paper, Oct. 24, 2016; DOI 10.1182/blood-2016-05- 718320) (Year: 2016).*
Jun et al (Oncotarget, 2017, vol. 8, (No. 9), pp. 14343-14358) (Year: 2017).*
Sarvothaman et al (Blood Res 2015;50:73-9, http://dx.doi.org/10.5045/br.2015.50.2.73) (Year: 2015).*
PCT International Search Report and Written Opinion, PCT Application No. PCT/GB2019/053102, mailed Jan. 15, 2020, 14 pages.
Kupzig, Sabine, Stephen F. Parsons, Elinor Curnow, David J. Anstee, and Allison Blair. "Superior survival of ex vivo cultured human reticulocytes following transfusion into mice." haematologica 102, No. 3 (2017): 476.
Zhao, Chen, Yan Xiu, John M. Ashton, Lianping Xing, Yoshikazu Morita, Craig T. Jordan, and Brenda Boyce. "Non-Canonical NF-Kb Signaling Regulates Hematopoietic Stem Cell Self-Renewal and Microenvironment Interactions." (2011): 859-859.
Severn, Charlotte E., and Ashley M. Toye. "The challenge of growing enough reticulocytes for transfusion." ISBT Science Series 13, No. 1 (2018): 80-86.
Hsieh, Yi-Hsien, Shu-Ching Hsieh, Chien-Hsing Lee, Shun-Fa Yang, Chun-Wen Cheng, Meng-Ju Tang, Chia-Liang Lin, Chu-Liang Lin, and Ruey-Hwang Chou. "Targeting EMP3 suppresses proliferation and invasion of hepatocellular carcinoma cells through inactivation of PI3K/Akt pathway." Oncotarget 6, No. 33 (2015): 34859.
Christians, Arne, Eric Poisel, Christian Hartmann, Andreas von Deimling, and Stefan Pusch. "Characterization of the epithelial membrane protein 3 interaction network reveals a potential functional link to mitogenic signal transduction regulation." International journal of cancer 145, No. 2 (2019): 461-473.
Anstee et al., Curr Opin Hematol., 2012, vol. 19, No. 3, pp. 163-169.
Esposito, M.T., "Blood factory: which stem cells?", BMC hematology, 2018, vol. 18, No. 1, p. 10.

(Continued)

*Primary Examiner* — Peter Paras, Jr.
*Assistant Examiner* — Khoa Nhat Tran
(74) *Attorney, Agent, or Firm* — McDonnell Boehnen Hulbert & Berghoff, LLP

(57) ABSTRACT

A method for producing erythroid cells comprising culturing erythroid-producer cells which are obtainable from an EMP3-negative individual, and/or have reduced expression of EMP3 and/or reduced expression of one or more downstream effectors of the EMP3 pathway.

16 Claims, 4 Drawing Sheets
Specification includes a Sequence Listing.

(56) References Cited

OTHER PUBLICATIONS

Gaj, T. et al., Trends Biotechnol., 2013, vol. 31, pp. 397-405.
Griffiths et al., Autophagy, 2012, vol. 8, No. 7, pp. 1150-1151.
Griffiths et al., Blood, 2012, vol. 119, No. 26, pp. 6296-6306.
Han, M.Xu, W., "EMP3 is induced by TWIST1/2 and regulates epithelial-to-mesenchymal transition of gastric cancer cells", Tumor Biology, 2017, vol. 39, No. 7.
Hawksworth, J. et al., "Enhancement of red blood cell transfusion compatibility using CRISPR-mediated erythroblast gene editing", EMBO Molecular Medicine, (20180000), vol. 10.6, p. e8454.
Hongxiao Chun et al., "Epithelial membrane protein 3 functions as an oncogene and is regulated by microRNA-765 in primary breast carcinoma", Molecular medicine reports, (20150000), vol. 12.5, pp. 6445-6450.
Jun, F. et al., "Epithelial membrane protein 3 regulates TGF-β signaling activation in CD44-high glioblastoma", Oncotarget, 2017, vol. 8, No. 9, p. 14343.
Kim et al., Yonsei Med J., 2014, vol. 55, No. 2, pp. 304-309.
Migliaccio et al., Blood Reviews, 2012, vol. 26, pp. 81-95.
Storry, J. R. et al., "International society of blood transfusion working party on red cell immunogenetics and terminology: report of the Seoul and London meetings", ISBT science series, (20160000), vol. 11.2, pp. 118-122.
Trakarnsanga, K. et al., "An immortalized adult human erythroid line facilitates sustainable and scalable generation of functional red cells", Nature communications, 2017, vol. 8, p. 14750.
UniProtKB accession P54852, printed Mar. 2024.
Wilson, H.L., et al., 2002."Epithelial membrane proteins induce membrane blebbing and interact with the P2X7 receptor C-terminus." Journal of Biological Chemistry.
Arne Christians, "Funktionelle Charakterisierung des putativen Tumorsuppressors "Epithelial Membrane Protein 3"", Inaugural-Dissertation zur Erlangung der Doktorwürde der Naturwissenschaftlich-Mathematischen Gesamtfakultät der Ruprecht—Karls—Universität Heidelberg, (Dec. 18, 2014), English Abstract p. 10.
Mao X et al., Evaluation of erythroblast macrophage protein related to erythroblastic islands in patients with hematopoietic stem cell transplantation. European Journal of Medical Research, 2013, vol. 18(9) 1-7.
Soni S et al., Absence of erythroblast macrophage protein (emp) leads to failure of erythroblast nuclear extrusion, Journal of Biological Chemistry Jul. 21, 2006, vol. 281, No. 29, pp. 20181-20189.
Thornton N et al., "Disruption of the tumour-associated EMP2 enhances erythroid proliferation and causes the MAM-negative phenotype", Nature Communications, 2020, vol. 11, Article Non 3569.
Trakarnsanga, et al., "An immortalized adult human erythroid line facilitates sustainable and scalable generation of functional red cells," Nature Communications, 2017, vol. 8, Article Non 14750.

* cited by examiner

A

B

METHOD FOR PRODUCING ERYTHROID CELLS

This application is a national stage application under 35 U.S.C. § 371 of International Application No. PCT/GB2019/053102, filed Oct. 31, 2019, which claims priority from GB Application No. 1818045.5, filed Nov. 5, 2018. The disclosures of each of these applications are incorporated herein by reference in their entirety for all purposes.

FIELD OF THE INVENTION

The present invention relates to methods for producing erythroid cells comprising culturing erythroid-producer cells which are obtainable from an EMP3-negative individual, and/or have reduced expression of EMP3 and/or reduced expression of one or more downstream effectors of the EMP3 pathway. The present invention also relates to erythroid cells prepared according to said methods and erythroid-producer cells which have reduced expression of EMP3 and/or reduced expression of one or more downstream effectors of the EMP3 pathway.

BACKGROUND TO THE INVENTION

The transfusion of red blood cells (RBCs) is an established and fundamental part of modern medicine. It has, however, always been limited by the availability of an active donor population. The main concerns for the continuous supply of donated blood worldwide are the demographic changes in the donor population, potential emerging diseases and implementation of new restrictions on donor eligibility. The development of synthetic artificial alternatives to donated blood may alleviate some of the pressure on blood supply in the future, but it is very unlikely that the demand for blood and blood products from whole blood will be reduced. The predicted shortfall in blood supply has triggered a number of different strategies for the development of alternatives to blood products, from haemoglobin substitutes to chemically treated antigen-free RBCs, with various degrees of success. In recent years, the better understanding of erythropoiesis coupled with technological advances has enabled the realistic investigations of ex vivo generation of erythroid cells (RBCs and their precursors).

The ex vivo production of erythroid cells utilises hematopoietic stem and progenitor cells from peripheral blood of adults, cord blood or induced pluripotent stem cells. Several research groups have successfully produced erythroid cells in small quantities (laboratory scale) using a variety of cell sources, cell culture conditions and media components. These developments have been thoroughly reviewed by Migliaccio et al (Blood Reviews 2012; 26: 81-95), Anstee et al (Curr Opin Hematol. 2012; 19(3): 163-169), Kim et al (Yonsei Med J. 2014; 55(2):304-309), and Severn and Toye (ISBT Sci Series 2017; 13: 80-86). The present inventors have established and tested in vitro manufacture of erythroid cells from adult and cord progenitor cells for a number of years (Griffiths et al, Blood 2012; 119(26): 6296-6306; Griffiths et al, Autophagy 2012; 8(7):1150-1151; Kupzig et al, Haematologica 2017; 102(3): 476-483). However, regardless of the source of the starting material, erythroid cell cultures are limited by the terminal differentiation of erythroid cells and do not yet produce economically viable quantities of erythroid cells required for therapeutic or diagnostic use. As an illustration, with a standard adult blood donation comprising $2\times10^{12}$ erythroid cells, recent experiments have produced $2.8\times10^{10}$ (Griffiths et al, Blood 2012; 119(26): 6296-6306) and approximately $6\times10^{10}$ cultured cells (Kupzig et al, Haematologica 2017; 102(3): 476-483) which are still on average 50-fold lower than the therapeutic dose.

The work to increase expansion potential has been carried out world-wide, with many approaches and protocols trying to achieve the maximum yield of erythroid cultures. A number of methods have been focusing on reiterating combinations of base media, feeder cell layers, additives and cytokines, whilst the others have tried to improve vessel environment by introducing support structures resembling bone marrow.

Alternatively, production of erythroid cells from immortalised erythroid cells lines could overcome these barriers by providing a sustainable supply of cultured red cells of desired blood group phenotypes. The first immortalised adult erythroid cell line, BEL-A (Bristol Erythroid cell Line from Adult progenitors) from adult bone marrow CD34+ cells has been established (Trakarnsanga et al, Nat Commun. 2017; 8: 14750). However, even the BEL-A cell line has not been demonstrated to be capable of producing large yields of erythroid cells.

Thus, there is a demand for improved methods for in vitro production of erythroid cells.

SUMMARY OF THE INVENTION

The inventors have found that erythroid-producer cells which are obtained from an EMP3-negative individual and/or have reduced expression of EMP3 are capable of producing greater yields of erythroid cells during in vitro production.

The inventors found that hematopoietic progenitor cells from EMP3-negative individuals exhibited enhanced cell proliferation during ex vivo culturing. They found that the enhanced cell proliferation in EMP3-negative samples was not the result of imbalanced or altered erythroid differentiation. They also found that EMP3 acts as a suppressor or regulator of proliferation in normal erythropoiesis and the lack of it improves in vitro cell proliferation.

The inventors have also found that a knock-down of EMP3 expression in an immortalised adult erythroid cell line resulted in enhanced cell proliferation during in vitro culturing.

According to the present invention, there is provided a method for producing erythroid cells comprising culturing erythroid-producer cells which are obtainable from an EMP3-negative individual, and/or have reduced expression of EMP3 and/or reduced expression of one or more downstream effectors of the EMP3 pathway.

In one aspect the present invention provides a method for producing erythroid cells comprising the steps of: (i) identifying an EMP3-negative individual; (ii) obtaining erythroid-producer cells from said EMP3-negative individual; and (iii) culturing said erythroid-producer cells.

In another aspect the present invention provides a method for producing erythroid cells comprising the steps of: (i) obtaining erythroid-producer cells; (ii) modifying said erythroid-producer cells to reduce expression of EMP3 and/or reduce expression of one or more downstream effectors of the EMP3 pathway; and (iii) culturing said erythroid-producer cells.

The erythroid-producer cell may be any cell that is capable of producing erythroid cells. The erythroid-producer cells of the present invention may be hematopoietic stem cells, hematopoietic progenitor cells, induced pluripotent stem cells and/or immortalized erythroid cells. Suitable erythroid-producer cells include hematopoietic stem cells and/or hematopoietic progenitor cells obtained from peripheral blood, umbilical cord blood or bone marrow. Suitable erythroid-producer cells also include hematopoietic stem cells, hematopoietic progenitor cells or induced pluripotent stem cells that express surface antigen CD34. Preferably the erythroid-producer cells are immortalized erythroid cells. Preferably the erythroid-producer cells are human erythroid-producer cells.

In some embodiments of the invention the method for producing erythroid cells further comprises the steps of inducing enucleation of the erythroid cells and/or purifying the erythroid cells.

According to some embodiments of the present invention the EMP3-negative individual lacks the EMP3 gene; has one or more mutations which reduce expression of EMP3; and/or has one or more mutations which render the EMP3 gene inactive. According to some embodiments of the present invention the EMP3-negative individual has erythrocytes with membrane surfaces that are devoid of EMP3 and/or no detectable EMP3 on their erythrocyte membrane surfaces.

In some embodiments the erythroid-producer cells are modified to reduce expression of EMP3 and/or to reduce expression of one or more downstream effectors of the EMP3 pathway. In some embodiments the modification reduces the transcription of the EMP3 gene and/or translation of the EMP3 polypeptide.

In some embodiments the expression of EMP3 is reduced compared to unmodified erythroid-producer cells. For example, by at least 10%, 20%, 30%, 40% or 50% compared to the unmodified erythroid-producer cells.

In some embodiments the reduced expression of EMP3 increases the yield of erythroid cells by at least 2, 3, 4 or 5 times.

The invention also provides erythroid cells obtained by the method of the invention. The invention also provides a composition comprising erythroid cells obtained by the method of the invention and a pharmaceutically acceptable carrier, diluent or excipient.

The invention provides a blood transfusion pack comprising erythroid cells obtained by the method of the invention and use of the erythroid cells obtained by the method of the invention for studying erythropoiesis in vitro.

The invention also provides a method of treating a human patient comprising transfusing the patient with erythroid cells obtained by the method of the invention and erythroid cells obtained by the method of the invention for use as a blood transfusion.

The invention also provides an erythroid-producer cell with reduced expression of EMP3 and/or reduced expression of one or more downstream effectors of the EMP3 pathway. Preferably the cell is an immortalized erythroid cell. In some embodiments the cell has been modified to reduce expression of EMP3 and/or expression of one or more downstream effectors of the EMP3 pathway. In some embodiments expression of EMP3 and/or the one or more downstream effectors is reduced by at least 10%, 20%, 30%, 40% or 50% compared to an unmodified erythroid-producer cell.

DETAILED DESCRIPTION

Figure 1:
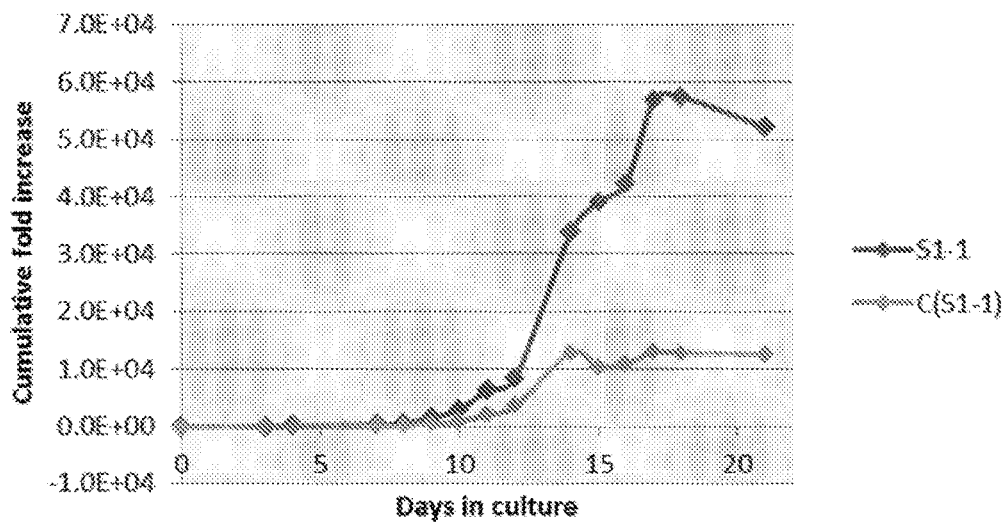
FIG. 1—Superior proliferation of EMP3-negative samples compared to age and gender matched controls in three independent experiments. CD34+ cells obtained from EMP3-negative individuals (51 and S2) and from EMP3-positive individuals (C(S-1), C1(S1-2), C2(S1-2), C1(S2) and C2(S2)) are cultured and cell proliferation over 21 days was measured and compared. A) 51 and C(S-1), B) 51, C1(S1-2) and C2(S1-2), C) S2, C1(S2) and C2(S2).
Figure 1:
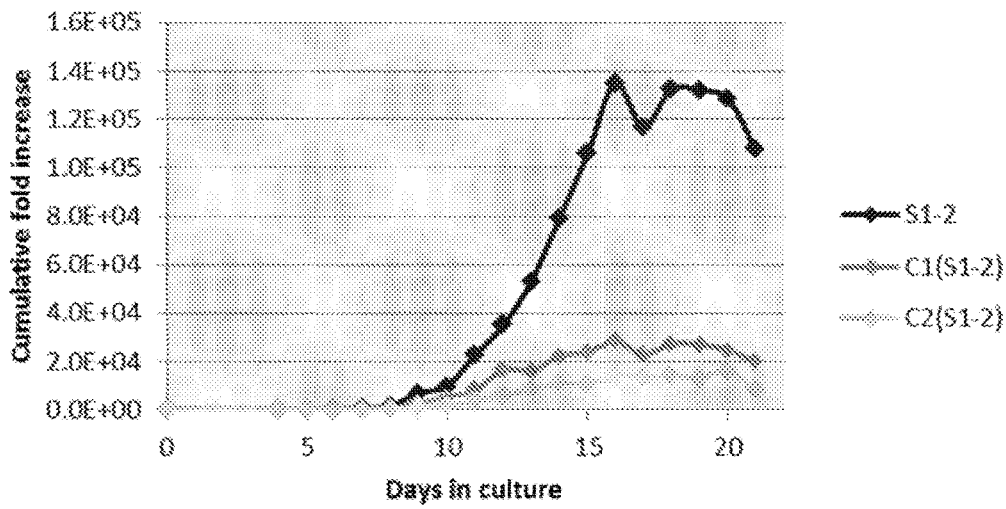
Figure 1:
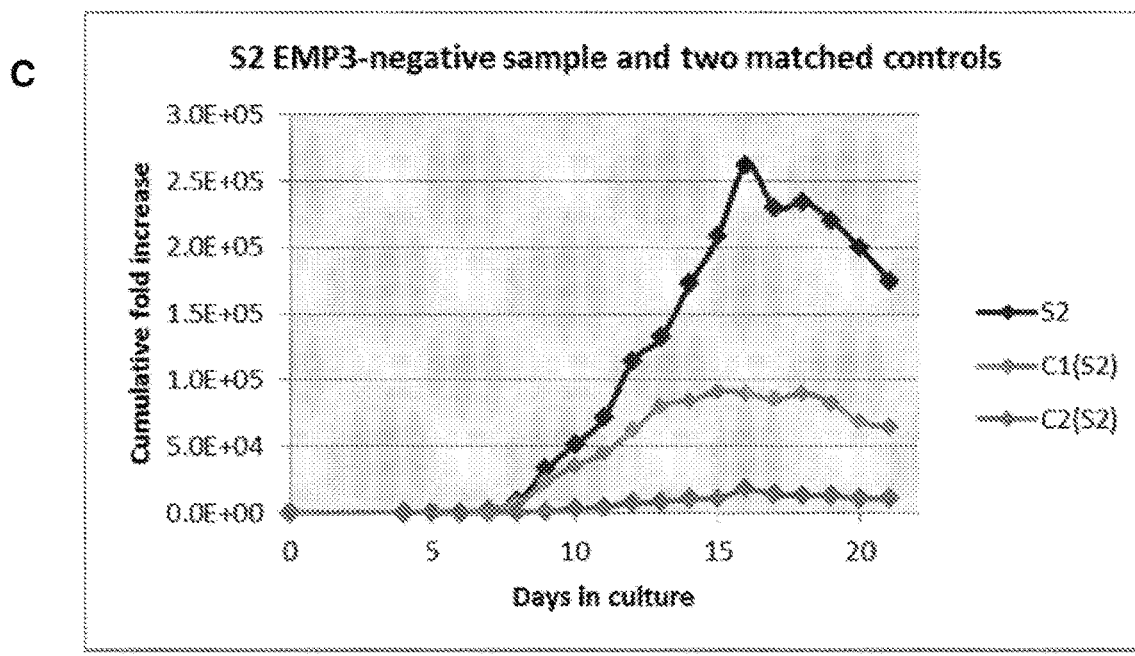

The terms "comprising", "comprises" and "comprised of" as used herein are synonymous with "including" or "includes"; or "containing" or "contains", and are inclusive or open-ended and do not exclude additional, non-recited members, elements or steps. The terms "comprising", "comprises" and "comprised of" also include the term "consisting of".

In one aspect the invention provides methods for producing erythroid cells comprising culturing erythroid-producer cells which are obtainable from an EMP3-negative individual, and/or have reduced expression of EMP3 and/or reduced expression of one or more downstream effectors of the EM P3 pathway.

Erythroid Cells

The term "erythroid cell" means a cell of the erythrocytic series. Thus the term includes pronormoblasts, basophilic normoblasts (early normoblasts or erythroblasts), polychromatic normoblasts (intermediate normoblasts), orthochromatic normoblasts (late normoblasts), reticulocytes and erythrocytes.

In some embodiments the erythroid cells of the present invention are enucleated erythroid cells. Thus, in some embodiments the erythroid cells are reticulocytes and/or erythrocytes.

Erythrocytes are also known as red blood cells (RBCs), red cells, red blood corpuscles or haematids.

The method of the present invention may be used to produce erythroid cells with desired blood group phenotypes, preferably rare blood group phenotypes. Blood group phenotypes will be well known to those of skill in the art, for example those disclosed in Storry, J. R., et al. "International society of blood transfusion working party on red cell immunogenetics and terminology: report of the Seoul and London meetings." ISBT science series 11.2 (2016): 118-122. Any method known in the art can be used to identify individuals with preferred blood group phenotypes for use in the present invention. Any method known in the art can be used to modify the erythroid-producer cells or erythroid cells of the present invention to produce erythroid cells with desired blood group phenotypes.

Erythroid-Producer Cells

The term "erythroid-producer cell" means any cell that is capable of producing erythroid cells. Sources of erythroid-producer cells will be well known to those of skill in the art, for example see Esposito, M. T., 2018. "Blood factory: which stem cells?". BMC hematology, 18(1), p. 10.

In some embodiments the erythroid-producer cells are cells capable of differentiation into erythroid cells, preferably reticulocytes and/or erythrocytes.

In some embodiments the erythroid-producer cells are human erythroid-producer cells.

In one embodiment the erythroid-producer cell of the present invention may be a hematopoietic stem cell or a hematopoietic progenitor cell.

As used herein "hematopoietic stem cells" are stem cells that have no differentiation potential to cells other than blood cells and "hematopoietic progenitor cells" are progenitor cells that have no differentiation potential to cells other than blood cells. The hematopoietic stem or progenitor cells can be of any source, preferably of human origin. The hematopoietic stem or progenitor cells may be obtained from a patient. They may be prepared from any biological sample, such as blood, e.g. peripheral blood, bone marrow, cord blood or fetal liver. The hematopoietic stem or progenitor cells can be isolated using commercially available antibodies that bind to cell surface antigens, e.g. CD34, using methods known to those of skill in the art. For example, the antibodies may be conjugated to magnetic beads and immunological procedures utilized to recover the desired cell type. In particular embodiments the hematopoietic stem or progenitor cells are identified by the presence of the antigenic marker CD34 (CD34+) and the absence of lineage (lin) markers. Preferably the hematopoietic stem or progenitor cells are CD34+ cells and/or lin(−) cells. Most preferably the hematopoietic stem or progenitor cells are CD34+ cells.

In another embodiment the erythroid-producer cell of the present invention may be a pluripotent stem cell, preferably an induced pluripotent stem cell.

As used herein "pluripotent stem cells" are cells that renew and can be induced to differentiate into blood stem cells. Examples of human pluripotent stem cells include human embryonic stem cells (ES cells), human embryonal carcinoma cells (EC cells), human embryonic germ cells (EG cells), human multipotent germline stem cells (mGS cells), human mesodermal stem cells, human mesenchymal stem cells and the like. In addition, human pluripotent stem cells include cells artificially prepared in such a manner as to have differentiation pluripotency, such as induced pluripotent stem cells (iPSCs). iPSC refers to a non-pluripotent cell that has been reprogrammed to a pluripotent state. iPSCs can be generated by methods known to those of skill in the art. iPSCs can be programmed to a desired cell type, such as a hematopoietic stem cell or a hematopoietic progenitor cell.

Protocols will be known to those of skill in the art that are useful for inducing differentiation of human pluripotent stem cells, for instance to hematopoietic stem cells and further to erythroid cells.

In another embodiment the erythroid-producer cell of the present invention may be an immortalized erythroid cell, such as a BEL-A or BEL-A2 cell.

As used herein an "immortalized erythroid cell" is from an immortalized erythroid cell line, also known as an immortalized erythroid progenitor cell, which can be maintained in culture through many passages. Immortalized erythroid progenitor cells can be grown in large amounts in simple medium yet the progenitor cells retain their capacity to differentiate into erythroid cells upon induction. To achieve cellular immortalization, proliferation of the cells must be stimulated, while terminal differentiation must be inhibited. To date, several factors have been identified that control these processes, including GATA-1, which promotes erythroid development; PU.1, which binds to GATA-1 and inhibits erythroid terminal differentiation; anti-apoptotic proteins BCL-2 and BCL-XL; c-Kit, which promotes erythroid progenitor differentiation; as well as c-Myc, a well-known immortalizing transcription factor.

The first immortalised adult erythroid cell line, BEL-A (Bristol Erythroid cell Line from Adult progenitors) from adult bone marrow CD34+ cells has been described in Trakarnsanga, K. et al 2017. "An immortalized adult human erythroid line facilitates sustainable and scalable generation of functional red cells." Nature communications, 8, p. 14750. Trakarnsanga et al. created the BEL-A cell line by utilising an inducible HPV16-E6/E7 expression system. They transduced adult bone marrow CD34+ cells with an HPV16-E6/E7 construct and maintained them in primary medium for 4 days. On day 5 cells were transferred to expression media containing doxycycline to induce expression of E6 and E7 and maintained in the same medium. Those of skill in the art will be able create an immortalised adult erythroid cell line using similar methods.

Epithelial Membrane Protein 3 (EMP3)

Epithelial membrane protein 3 (EMP3) has been extensively explored in literature as a tumour suppressor gene and as an oncogene in studies of cancers from diverse tissues, e.g. glioma, breast carcinoma, uveal melanoma, hepatocellular carcinoma, urothelial carcinoma. However, there are no studies that have examined any association of the gene with erythroid proliferation. The present inventors examined the role of EMP3 in erythropoiesis using in-house ex vivo culture systems and found that EMP3 acts as a suppressor or regulator of proliferation in normal erythropoiesis and that the lack of it improves in vitro erythroid proliferation.

EMP3 is also known as YMP, epithelial membrane protein 3, hematopoietic neural membrane protein 1, HNMP-1 or Protein YMP. EMP3 is a protein that in humans is encoded by the EMP3 gene (NCBI Gene ID 2014). The protein encoded by EMP3 belongs to the PMP-22/EMP/MP20 family of proteins. The protein contains four transmembrane domains and two N-linked glycosylation sites. EMP3 is described in Hong, Xiao Chun, et al. "Epithelial membrane protein 3 functions as an oncogene and is regulated by microRNA-765 in primary breast carcinoma." Molecular medicine reports 12.5 (2015): 6445-6450.

The EMP3 polypeptide may be the amino acid sequence of human EMP3, such as UniProtKB accession P54852:

```
                                          (SEQ ID NO: 1)
MSLLLLVVSALHILILILLFVATLDKSWWTLPGKESLNLWYDCTWNNDT

KTWACSNVSENGWLKAVQVLMVLSLILCCLSFILFMFQLYTMRRGGLFY

ATGLCQLCTSVAVFTGALIYAIHAEEILEKHPRGGSFGYCFALAWVAFP

LALVSGIIYIHLRKRE
```

Another example amino acid sequence of human EMP3 is:

```
                                          (SEQ ID NO: 2)
MSLLLLVVSALHILILILLFVATLDKSWWTLPGKESLNLWYDCTWNNDT

KTWACSNVSENGWLKAVQVLMVLSLILCCLSFILFMFQLYTMRRGGLFY
```

```
ATGLCQLCTSVAVFTGALIYAIHAEEILEKHPRGGSFGYCFALAWVAFP

LALVSGIIYIHLRKRD
```

An example nucleotide sequence encoding human EMP3 is:

```
                                              (SEQ ID NO: 3)
ATGAGCCTGCTGCTGCTGGTGGTGAGCGCGCTGCATATTCTGATTCTGA

TTCTGCTGTTTGTGGCGACCCTGGATAAAAGCTGGTGGACCCTGCCGGG

CAAAGAAAGCCTGAACCTGTGGTATGATTGCACCTGGAACAACGATACC

AAAACCTGGGCGTGCAGCAACGTGAGCGAAAACGGCTGGCTGAAAGCGG

TGCAGGTGCTGATGGTGCTGAGCCTGATTCTGTGCTGCCTGAGCTTTAT

TCTGTTTATGTTTCAGCTGTATACCATGCGCCGCGGCGGCCTGTTTTAT

GCGACCGGCCTGTGCCAGCTGTGCACCAGCGTGGCGGTGTTTACCGGCG

CGCTGATTTATGCGATTCATGCGGAAGAAATTCTGGAAAAACATCCGCG

CGGCGGCAGCTTTGGCTATTGCTTTGCGCTGGCGTGGGTGGCGTTTCCG

CTGGCGCTGGTGAGCGGCATTATTTATATTCATCTGCGCAAACGCGAA
```

EMP3-Negative Individual

In one aspect the method for producing erythroid cells of the present invention comprises culturing erythroid-producer cells which are obtainable from an EMP3-negative individual.

Accordingly, the current invention provides methods for producing erythroid cells comprising the steps of: (i) identifying an EMP3-negative individual; (ii) obtaining erythroid-producer cells from said EMP3-negative individual; and (iii) culturing said erythroid-producer cells. Preferably, said erythroid-producer cells may be hematopoietic stem cells, hematopoietic progenitor cells and/or induced pluripotent stem cells. Most preferably said erythroid-producer cells may be hematopoietic stem or progenitor cells.

As used herein an "EMP3-negative individual" is an individual who has less EMP3 on erythrocyte membrane surfaces than an "EMP3-positive individual". According to some embodiments of the present invention the EMP3-negative individual has erythrocytes with membrane surfaces that are devoid or substantially devoid of EMP3. According to some embodiments of the present invention the EMP3-negative individual has no EMP3 detected on their erythrocyte membrane surfaces. According to some embodiments of the present invention an EMP3-positive individual has EMP3 detected on their erythrocyte membrane surfaces.

The presence and/or amount of EMP3 on their erythrocyte membrane surfaces of an individual can be determined by any method known to those of skill in the art. In a preferred embodiment the presence and/or amount of EMP3 on their erythrocyte membrane surfaces of an individual may be determined by an enzyme-linked immunosorbent assay (ELISA), preferably a sandwich ELISA, most preferably quantitative sandwich ELISA.

For example, anti-EMP3 antibody may be pre-coated onto 96-well plates and biotin conjugated anti-EMP3 antibody used as detection antibodies. The standards, test samples and biotin conjugated detection antibody can be added to the wells subsequently, and washed with wash buffer. HRP-Streptavidin may be added and unbound conjugates washed away with wash buffer. TMB substrates may be used to visualize HRP enzymatic reaction as TMB may be catalysed by HRP to produce a blue colour product that changes to yellow after adding acidic stop solution. The density of yellow is proportional to the EMP3 amount of sample captured in plate. The concentration of EMP3 can be calculated by reading the O.D. absorbance at 450 nm in a microplate reader. Suitable ELISA kits include EMP3 (Epithelial Membrane Protein 3) BioAssay™ ELISA Kit (Human) by United States Biological.

According to some embodiments of the present invention an EMP3-negative individual lacks the EMP3 gene; has one or more mutations which reduce expression of EMP3; and/or has one or more mutations which render the EMP3 gene inactive. Preferably, an EMP3-negative individual has one or more mutations which render the EMP3 gene inactive. Methods to determine whether an individual lacks the EMP3 gene, has one or more mutations that reduce expression of EMP3 and/or one or more mutations that render the gene inactive will be well known to those of skill in the art. In some embodiments whole-exome sequencing is used to determine whether an individual lacks the EMP3 gene, has one or more mutations that reduce expression of EMP3 and/or one or more mutations that render the EMP3 gene inactive.

In some embodiments the erythroid-producer cells are enriched prior to culturing.

For example, once erythroid-producer cells are obtained from an individual the resulting population of erythroid-producer cells may be screened to select and enrich for those erythroid-producer cells exhibiting the phenotype of interest, for example decreased expression of EM P3. Suitable techniques for screening and enrichment are known in the art and include flow cytometry and fluorescence-activated cell sorting (FACS).

Reduced Expression of EMP3

In one aspect the method for producing erythroid cells of the present invention comprises culturing erythroid-producer cells which have reduced expression of EMP3.

Accordingly, the current invention provides methods for producing erythroid cells comprising the steps of: (i) obtaining erythroid-producer cells; (ii) modifying said erythroid-producer cells to reduce expression of EMP3; and (iii) culturing said erythroid-producer cells. Preferably, said erythroid-producer cells may be immortalized erythroid cells.

In some embodiments the erythroid-producer cells of the present invention have expression of EMP3 reduced by at least 10%, 20%, 30%, 40%, 50%, 60%, 70%, 80%, 90% or 100% compared to reference erythroid-producer cells. Preferably the expression of EMP3 is reduced by at least 10%, 20%, 30%, 40% or 50% compared to reference erythroid-producer cells. Most preferably the expression of EMP3 is reduced by at least about 50% compared to reference erythroid-producer cells. As used herein, the term "reference erythroid-producer cell" refers to corresponding erythroid-producer cells obtainable from EMP3-positive individuals and/or unmodified corresponding erythroid-producer cells. The number of EMP3 molecules per cell may be determined by any method known to those of skill in the art. In one embodiment the number of EMP3 molecules is determined by fluorescence microscopy.

In some embodiments the cells of the present invention have expression of EMP3 transcripts reduced by at least 10%, 20%, 30%, 40%, 50%, 60%, 70%, 80%, 90% or 100% compared to reference cells. Preferably the expression of EMP3 transcripts is reduced by at least 10%, 20%, 30%, 40% or 50% compared to reference cells. Most preferably the expression of EMP3 transcripts is reduced by at least about 50% compared to reference cells. The number of EMP3 gene transcripts per cell may be determined by any method known to those of skill in the art. In one embodiment the number of EMP3 gene transcripts per cell is determined by QPCR.

In one embodiment the method for producing erythroid cells of the present invention comprises modifying erythroid-producer cells to reduce expression of EMP3 prior to culturing said erythroid-producer cells.

In some embodiments the modified erythroid-producer cells have reduced transcription of the EMP3 gene and/or reduced translation of the EMP3 polypeptide. The transcription of the EMP3 gene may be measured by any method known to those of skill in the art. In one embodiment the transcription of the EMP3 gene is measured by QPCR. The translation of the EMP3 polypeptide may be measured by any method known to those of skill in the art. In one embodiment the translation of the EMP3 polypeptide is measured by flow cytometry.

In some embodiments the expression of EMP3 is reduced compared to unmodified or reference erythroid-producer cells. In preferred embodiments the expression of EMP3 is reduced compared to unmodified erythroid-producer cells. As used herein, the term "unmodified erythroid-producer cell" refers to corresponding erythroid-producer cells that have not been modified to reduce or increase the expression of EMP3. In some embodiments the expression of EMP3 is reduced by at least 10%, 20%, 30%, 40%, 50%, 60%, 70%, 80% or 90% compared to reference or unmodified erythroid-producer cells. Preferably the expression of EMP3 is reduced by at least 10%, 20%, 30%, 40% or 50% compared to reference or unmodified erythroid-producer cells. Most preferably the expression of EMP3 is reduced by at least about 50% compared to reference or unmodified erythroid-producer cells.

In one embodiment the erythroid-producer cells are genetically engineered to reduce expression of EMP3. In one embodiment, at least about 50%, 60%, 70%, 75%, 80%, 85%, 90%, 95%, 96%, 97%, 98%, 99% or 100% of the cells in the population have been genetically engineered according to the present invention.

Methods for genetic engineering to decrease protein expression are known in the art. For example, this may be achieved by targeted gene knockout. To decrease protein expression, the gene encoding the protein itself or its regulatory sequence (e.g. its promoter) may be knocked out. Knockout may be achieved by deletion of a section of the coding nucleic acid sequence, which may delete a section of the protein essential for expression or stability, or alter the reading frame of the coding sequence. Suitable methods for targeted gene knockout include use of zinc finger nucleases (ZFNs), transcription activator-like effector nucleases (TAL-ENs) and CRISPR/Cas-based RNA-guided nucleases (Gaj, T. et al. (2013) Trends Biotechnol. 31: 397-405).

For example, the CRISPR/Cas9 RNA-guided nuclease may be used to catalyse a double strand break at a specific locus in the genome if provided with appropriate RNA guides designed to bind that locus. Cas9 and the guide RNA may be delivered to a target cell by transfection of vectors encoding the protein and RNA. Cells attempt to repair any double strand breaks in their DNA using the non-homologous end joining (NHEJ) pathway. This is an error-prone mechanism which inserts random nucleotides and often disrupts the reading frame of the targeted gene. CRISPR-mediated erythroblast gene editing of the BEL-A immortalized cell line is described in Hawksworth, J., et al. "Enhancement of red blood cell transfusion compatibility using CRISPR-mediated erythroblast gene editing." EMBO Molecular Medicine 10.6 (2018): e8454.

Alternatively, the genetic engineering to decrease protein expression may be accomplished using RNAi techniques, or microRNA or antisense RNA to suppress expression of the target gene.

For example, a small hairpin RNA or short hairpin RNA (shRNA) may be introduced into the cell to silence gene expression via RNA interference (RNAi). shRNA are synthesized in the nucleus of cells, further processed and transported to the cytoplasm and then incorporated into the RNA-interfering silencing complex (RISC) for activity. Expression of shRNA in cells can incorporate different promoters and is accomplished by delivery of plasmids or through viral or bacterial vectors. For example, targeted shRNA lentiviral transduction may be used to knock-down the expression of EMP3. A suitable shRNA is set forth below:

SEQ ID NO: 4: GeneCopoeia Inc. EMP3 clone set #HSH004823-LVRU6GP; target sequences sh4: 5'-ATCCTCATTCTTATACTGCTT-3'

SEQ ID NO: 5: a scrambled control #CSHCTR001-1-LVRU6GP; target sequence 5'-GCTTCGCGCCGTAGTCTTA-3'

In some embodiments the erythroid-producer cells are enriched prior to culturing.

For example, once the targeted gene knockout or suppression of expression approach has been carried out, the resulting population of erythroid-producer cells may be screened to select and enrich for those erythroid-producer cells exhibiting the phenotype of interest, for example decreased expression of EMP3. Suitable techniques for screening and enrichment are known in the art and include flow cytometry and fluorescence-activated cell sorting (FACS). The population of enriched erythroid-producer cells may consist of at least 20%, 40%, 50%, 60%, 70%, 80%, 90%, 95% or 99%, preferably at least 80%, 90%, 95% or 99%, most preferably about 90% erythroid-producer cells with low or reduced levels of EMP3 expression as defined herein.

The cell may comprise genetically engineered disruptions in all copies of the gene encoding EMP3.

Upstream and Downstream Components of the EMP3 Pathway

In one aspect the invention provides methods for producing erythroid cells comprising culturing erythroid-producer cells which have reduced expression and/or activity of one or more downstream components of the EMP3 pathway. A downstream component of the EMP3 pathway is also known as an EMP3 effector.

Preferably the expression and/or activity of the downstream effectors are reduced by modifying the erythroid-producer cell, for example by genetic engineering. In some embodiments expression and/or activity of the downstream effectors is reduced by at least 10%, 20%, 30%, 40%, 50%, 60%, 70%, 80%, 90% or 100% compared to a reference or unmodified erythroid-producer cell. In some embodiments expression of the downstream effectors is reduced by at least 50% compared to a reference or unmodified erythroid-producer cell. The expression and activity may be determined by any method known to those of skill in the art.

Accordingly, the current invention provides methods for producing erythroid cells comprising the steps of: (i) obtaining erythroid-producer cells; (ii) modifying said erythroid-producer cells to reduce expression and/or activity of one or more downstream effectors of the EMP3 pathway; and (iii) culturing said erythroid-producer cells.

The inventors have found that erythroid-producer cells which are obtained from an EMP3-negative individual and/or have reduced expression of EMP3 are capable of producing greater yields of erythroid cells during in vitro production. Knockdown of EMP3 also effects the expression and/or activity of other proteins. Therefore, it may be possible to reduce expression and/or activity of these downstream components (effectors) to also produce greater yields of cells.

Downstream effectors of the EMP3 pathway (EMP3 effectors) are well known. For instance, Hsieh et al, (Hsieh, Y. H., et al., 2015. "Targeting EMP3 suppresses proliferation and invasion of hepatocellular carcinoma cells through inactivation of PI3K/Akt pathway". Oncotarget, 6(33), p. 34859) have shown that knockdown of EMP3 in hepatocellular carcinoma (HCC) cells is known to decrease the expression and activity of matrix metalloproteinase 9 (MMP-9) and urokinase plasminogen activator (uPA). Knockdown of EMP3 in HCC cells was also shown to decrease the expression of p85 and inhibits phosphatidylinositol 3-kinase (PI3K) activity, leading to inactivation of Protein Kinase B (Akt). Wilson et al. (Wilson, H. L., et al., 2002. "Epithelial membrane proteins induce membrane blebbing and interact with the P2X7 receptor C-terminus." Journal of Biological Chemistry) have also shown that EMP3 interacts with the P2X(7) receptor. Jun et al. (Jun, F., et al., 2017. "Epithelial membrane protein 3 regulates TGF-β signaling activation in CD44-high glioblastoma". Oncotarget, 8(9), p. 14343) have also shown that EMP3 interacts with TGF-β receptor type 2 (TGFBR2) and regulates the TGF-β/Smad2/3 signaling pathway, and also decreases the activity of nuclear factor kappa-light-chain-enhancer of activated B cells (NF-κB). Methods to identify further downstream effectors of the EMP3 pathway are well known to those of skill in the art.

Thus, in some embodiments the downstream effectors of the EMP3 pathway comprise one or more of the proteins selected from the list consisting of: MMP-9, uPA, PI3K, Akt, P2X(7) receptor, TGFBR2, Smad2, Smad3, NF-κB.

In one aspect the invention provides methods for producing erythroid cells comprising culturing erythroid-producer cells which have reduced expression and/or activity of one or more upstream components of the EMP3 pathway. Preferably the expression and/or activity of the upstream components is reduced by modifying the erythroid-producer cell, for example by genetic engineering. In some embodiments expression and/or activity of the upstream components is reduced by at least 10%, 20%, 30%, 40%, 50%, 60%, 70%, 80%, 90% or 100% compared to a reference or unmodified erythroid-producer cell. In some embodiments expression of the upstream components is reduced by at least 50% compared to a reference or unmodified erythroid-producer cell. The expression and/or activity may be determined by any method known to those of skill in the art.

Accordingly, the current invention provides methods for producing erythroid cells comprising the steps of: (i) obtaining erythroid-producer cells; (ii) modifying said erythroid-producer cells to reduce expression and/or activity of one or more upstream components of the EMP3 pathway; and (iii) culturing said erythroid-producer cells.

Similarly to downstream effectors, it may be possible to reduce expression and/or activity of upstream components to produce greater yields of cells. Upstream components of the EMP3 pathway (EMP3 effectors) are well known. For instance, Han et al (Han, M. and Xu, W., 2017. "EMP3 is induced by TWIST1/2 and regulates epithelial-to-mesenchymal transition of gastric cancer cells". Tumor Biology, 39(7)) have shown that EMP3 is a downstream effector of TWIST 1/2. Methods to identify further upstream components of the EMP3 pathway are well known to those of skill in the art.

Thus, in some embodiments the upstream components of the EMP3 pathway comprise one or more of the proteins selected from the list consisting of: TWIST1, TWIST2.

Accordingly, in some embodiments the erythroid-producer cells of the present invention have expression and/or activity reduced for one or more of the proteins selected from the list consisting of: EMP3, MMP-9, uPA, PI3K, Akt, P2X(7) receptor, TWIST1, TWIST2.

Erythroid Cell Production

Methods for producing erythroid cells (blood cell/progenitor cell differentiation induction cultures) are known in the art, for example methods are described in US2007218552 and Severn and Toye (ISBT Sci Series 2017; 13: 80-86). The method for culturing and differentiating the erythroid-producer cell will depend upon the cell used and improved methods for culturing and differentiating hematopoietic stem cells, hematopoietic progenitor cells, pluripotent stem cells and immortalized erythroid cells are being developed continually. The present invention is not dependent on any particular cell or any particular culture method. For general methods of blood cell/progenitor cell differentiation induction culture, see, e.g. US2017037373, KR20130055313, KR20100081678, CN107201338 and KR20140011912.

The cell culture and modifications may be conducted in vitro.

In some embodiments of the invention the erythroid-producer cells are cultured in a defined medium. The defined culture medium used in the present invention may include general components for culture of animal cells. Examples of suitable media include Eagle's minimum essential medium (Eagle's MEM), α-MEM, Iscove's MEM, 199 medium, CMRL 1066, RPMI 1640, F12, F10, DMEM, mixture of DMEM and F12, Way-mouth's MB752/I, Iscove's modified Dulbecco's medium, Iscove's modified Fisher's medium or Iscove's modified Eagle's medium, McCoy's 5A, MCDB series, AIM-V medium, and modified media thereof. A detailed description of the media can be found in R. I. Freshney, Culture of Animal Cells, A Manual of Basic Technique, Alan R. Liss, Inc., New York. In some embodiments the defined medium is Iscove's modified Dulbecco's medium, preferably when the erythroid-producer cells are hematopoietic stem or progenitor cells.

In some embodiments the medium used in the present invention comprises one or more cytokines and/or growth factors. In some embodiments the medium used in the present invention comprises at least one component selected from the list consisting of: stem cell factor (SCF), interleukin 3 (IL-3), IL-1, IL-4, IL-5, IL-11, erythropoietin (EPO), granulocyte macrophage-colony stimulating factor (GM-CSF), macrophage colony-stimulating factor (M-CSF), granulocyte-colony stimulating factor (G-CSF), hydrocortisone and transferrin. Preferably the medium used in the present invention comprises SCF, IL-3, EPO and/or transferrin. The amount of cytokines and/or growth factors used in the cultures depends on the activity of the factor preparation and on the combination used. Typically, concentrations range from 0.5 to 500 ng/ml. The optimum concentration of each cytokine or growth factor has to be determined for individual culture conditions since some cytokines and/or growth factors act synergistically.

In some embodiments of the invention the erythroid-producer cells are cultured in the presence of supporting cells. The purpose of supporting cells is to mimic the native marrow microenvironment. In the context of the invention, the supporting cells are cells that in vitro support the growth of the hematopoietic stem cells and their maturation into erythroid cells. These supporting cells can originate from embryo, fetus or any conjunctive tissue. Preferably, they originate from a marrow microenvironment. In a preferred embodiment, the supporting cells are stromal cells, or mesenchymal cells.

In some embodiments of the invention the erythroid-producer cells are cultured in the absence of supporting cells.

The method of culturing may comprise a number of media stages in which the culture medium is changed. For example, 2 to 4 stages each with the inclusion or omission of multiple cytokines. For example, the method of culturing may comprise: an expansion stage with SCF, IL-3, EPO; a secondary expansion stage with SCF, EPO and transferrin; a terminal differentiation stage with EPO and holotransferrin. Optionally, thrombopoietin (TPO), interleukin-6 (IL-6) and fms-like tyrosine kinase 3 (Flt-3) and glucocorticoids may be added to increase expansion prior to differentiation.

In some embodiments of the invention the method further comprises the step of converting fetal globin into adult globin. Erythroid cells obtained from cord blood have fetal haemoglobin rather than adult globin. This is not anticipated to be a problem since the persistence of high levels of fetal globin is known to be a benign condition. Methods of converting fetal globin into adult globin are well known to those of skill in the art e.g. WO2013104909. In some embodiments the erythroid-producer cells are modified to express one or more transcription factor to convert fetal globin into adult globin. For example, the transcription factor may be selected from BCL11A, other isoforms of BCL11A, EKLF, tagged forms of EKLF, GATA 1, FOG 1, SCL, SOX6 and any variants thereof, preferably a combination of BCL11A and EKLF.

In some embodiments of the invention the method further comprises the step of inducing enucleation of the erythroid cells. Preferably, when the erythroid-producer cells are iPSCs. Methods of inducing enucleation are well known to those of skill in the art e.g. WO201009807. Preferably the medium does not comprise cytokines at the stage of enucleation. In some embodiments the enucleation rate is at least 10, 20, 30, 40, 50%, preferably at least about 50%.

Suitable culturing conditions will be known to those of skill in the art. For example, the erythroid-producer cells may be cultured at about 0.5 to $1 \times 10^5$/ml in about 5% $CO_2$ at about 37° C.

The time of culturing depends on the cell type, culture conditions, and degree of desired expansion. Routine procedures known to those of ordinary skill in the art can be used to determine the number of cells in culture as a function of increasing incubation time of the cultured cells. Typically, expansion (increase in cell number) is measured by counting the cell numbers by, for example, measuring incorporation of a specific dye or determining the hematocrit, using a hematocytometer or cell counter. In some embodiments the duration of culture may be at least about e.g. 6, 10, 14, 21 or 28 days. For example, about 6 to about 28 days or about 10 to about 21 days.

In some embodiments of the invention the method further comprises the step of purifying the erythroid cells. For example the crude cell mixture may be filtered through leucocyte filters in order to remove free nuclei and obtain substantially a pure population of erythroid cells. In some embodiments the population of erythroid cells is at least 80%, 90%, 95% or 98% pure. In some preferred embodiments the crude cell mixture is purified to obtain a substantially pure population of enucleated erythroid cells (reticulocytes and erythrocytes). In some embodiments the population of enucleated erythroid cells is at least 80%, 90%, 95% or 98% pure.

In some embodiments the reduced expression of EMP3 increases the yield of erythroid cells by at least 2, 3, 4, or 5 times, preferably by at least 5 times. In some embodiments the method of the present invention yields at least $10^{10}$ erythroid cells, for example at least $2 \times 10^{10}$, $5 \times 10^{11}$ or $1 \times 10^{11}$ erythroid cells. Most preferably the method of the present invention yields at least about $10^{11}$ erythroid cells. In some embodiments the method of the present invention yields a cumulative fold increase of erythroid-producer cells and/or erythroid cells of greater than about $10^5$ after about 16 days, preferably wherein the erythroid-producer cells are hematopoietic stem and/or progenitor cells. In some embodiments the method of the present invention yields a cumulative fold increase of erythroid-producer cells and/or erythroid cells of greater than about $10^8$ after about 23 days, preferably wherein the erythroid-producer cells are immortalized erythroid cells. In some embodiments the method of the present invention yields a cumulative fold increase of erythroid-producer cells and/or erythroid cells of greater than about $10^9$ after about 26 days, preferably wherein the erythroid-producer cells are immortalized erythroid cells.

In some embodiments the erythroid-producer cells of the present invention have a decreased doubling time compared to reference or unmodified erythroid-producer cells. For example, the erythroid-producer cells of the present invention may have a doubling time of about 24, 23, 22 or 21 hours or less, preferably about 21 hours or less, preferably wherein the erythroid-producer cells are an immortalized erythroid cell.

Uses of Erythroid Cells

In one aspect there is also provided erythroid cells obtained by the method of the invention.

In some embodiments the erythroid cells have less than 10%, 20%, 30%, 40%, 50%, 60%, 70%, 80% or 90% of the EMP3 on their membrane surfaces compared to reference erythroid cells, preferably less than 50%. As used herein, the term "reference erythroid cell" refers to erythroid cells obtained from erythroid-producer cells obtainable from EMP3-positive individuals and/or unmodified erythroid-producer cells. In some embodiments the erythroid cells obtained by the method of the present invention have no detectable EMP3 on their membrane surfaces. The amount of EMP3 on their membrane surfaces may be determined by any method known to those of skill in the art. In one embodiment the amount of EMP3 is determined by flow cytometry.

In some embodiments the erythroid cells obtained by the method of the invention comprise at least about $10^{11}$ erythroid cells.

The invention also provides a composition comprising erythroid cells obtained by the method of the invention and a pharmaceutically acceptable carrier, diluent or excipient.

The invention further provides a blood transfusion pack comprising erythroid cells obtained by the method of the invention.

The erythroid cells obtained by the method of the invention may be used for studying erythropoiesis in vitro.

In another aspect the invention also provides a method of treating a human patient comprising transfusing the patient with erythroid cells obtained by the method of the invention.

In another aspect the invention provides erythroid cells obtained by the method of the invention for use as a blood transfusion. For example, the erythroid cells obtained by the method of the invention may be used to replace blood lost during operations or serious injuries or to treat a severe infection.

The erythroid cells obtained by the method of the invention may also be used to treat patients who require erythroid cells because of illness. For example, erythroid cells obtained by the method of the invention may be used to treat a severe infection or liver disease (that stops blood being made normally), anemia (for example caused by kidney disease, cancer, caused by medicines or radiation treatments) or a bleeding disorder (such as haemophilia or thrombocytopenia).

In some embodiments the patient is human.

Erythroid-Producer Cell with Reduced Expression of EMP3

In a further aspect there is also provided an erythroid-producer cell with reduced expression of EMP3 and/or reduced expression of one or more downstream effectors of the EMP3 pathway. Preferably the cell has reduced expression of EMP3.

The erythroid-producer cell of the present invention may be a hematopoietic stem cell, a hematopoietic progenitor cell, an induced pluripotent stem cell and/or an immortalized erythroid cell. Most preferably the cell is an immortalized erythroid cell.

In some embodiments the erythroid-producer cell of the present invention has expression of EMP3 and/or the one or more downstream effectors reduced by at least 10%, 20%, 30%, 40%, 50%, 60%, 70%, 80%, 90% or 100% compared to a reference erythroid-producer cell. Preferably the expression of EMP3 and/or the one or more downstream effectors is reduced by at least 10%, 20%, 30%, 40% or 50% compared to a reference erythroid-producer cell. Most preferably the expression of EMP3 and/or the one or more downstream effectors is reduced by at least about 50% compared to a reference erythroid-producer cell.

In some embodiments the erythroid-producer cell of the present invention has expression of EMP3 transcripts reduced by at least 10%, 20%, 30%, 40%, 50%, 60%, 70%, 80%, 90% or 100% compared to a reference erythroid-producer cell. Preferably the expression of EMP3 transcripts is reduced by at least 10%, 20%, 30%, 40% or 50% compared to a reference erythroid-producer cell. Most preferably the expression of EMP3 transcripts is reduced by at least about 50% compared to a reference erythroid-producer cell.

In some embodiments the erythroid-producer cell has been modified to reduce expression of EMP3 and/or expression of one or more downstream effectors of the EMP3 pathway. In some embodiments the modification reduces the transcription of the EMP3 gene and/or translation of the EMP3 polypeptide.

In one preferred embodiment the erythroid-producer cell is an immortalized erythroid cell and expression of EMP3 is reduced by at least 10%, 20%, 30%, 40% or 50%, preferably about 50%, compared to an unmodified immortalized erythroid cell.

EXAMPLES

Example 1—Identification of EMP3-Negative Individuals

Nine EMP3-negative individuals were initially investigated by serology due to pregnancy and anti-EMP3 production. Whole-exome sequencing was used to identify the lack of EMP3 candidate gene and then inactivating mutations were demonstrated in ten known EMP3-negative individuals.

Example 2—Culturing Hematopoietic Cells from EMP3-Negative Individuals

Hematopoietic progenitor CD34+ cells from the peripheral blood of two EMP3-negative individuals and five age and gender matched EMP3-positive individuals were cultured and compared in three independent experiments.

CD34+ cells were obtained either from whole blood units or buffy coats and isolated by positive selection with the MiniMACS magnetic bead system (Miltenyi Biotec, Bisley, UK). The cells were cultured following the three-stage culture protocol with Iscove's modified Dulbecco's medium (Biochrom IMDM, Source BioScience, Nottingham, UK) supplemented with the following cytokines: 10 µg/mL recombinant human (rH) stem cell factor, 1 µg/mL rH interleukin 3 (R&D Systems Europe, Abingdon, UK), 3 IU/mL erythropoietin (Roche Products, Welwyn Garden City, UK), human transferrin 200 µg/mL (R&D Systems). Cells were cultured at 0.5 to $1 \times 10^5$/mL in 5% $CO_2$ at 37° C. Cell proliferation was recorded daily and aliquots were removed during the 21-day culture period for morphological examination (cytospins) and flow cytometry analysis.

The results revealed a marked increase in proliferation in EMP3-negative cultures (FIG. 1), seen on all days of the culture. For instance, FIG. 1B shows that CD34+ cells obtained from EMP3-negative individual S1 (S1-2) exhibited a cumulative fold increase of around $1.0 \times 10^5$ after 16 days, compared to around $1.0 \times 10^4$ for CD34+ cells cultured from an age and gendered matched EMP3-positive individual (C2(S1-2)), around a 5-fold increase in proliferation.

Figure 2:
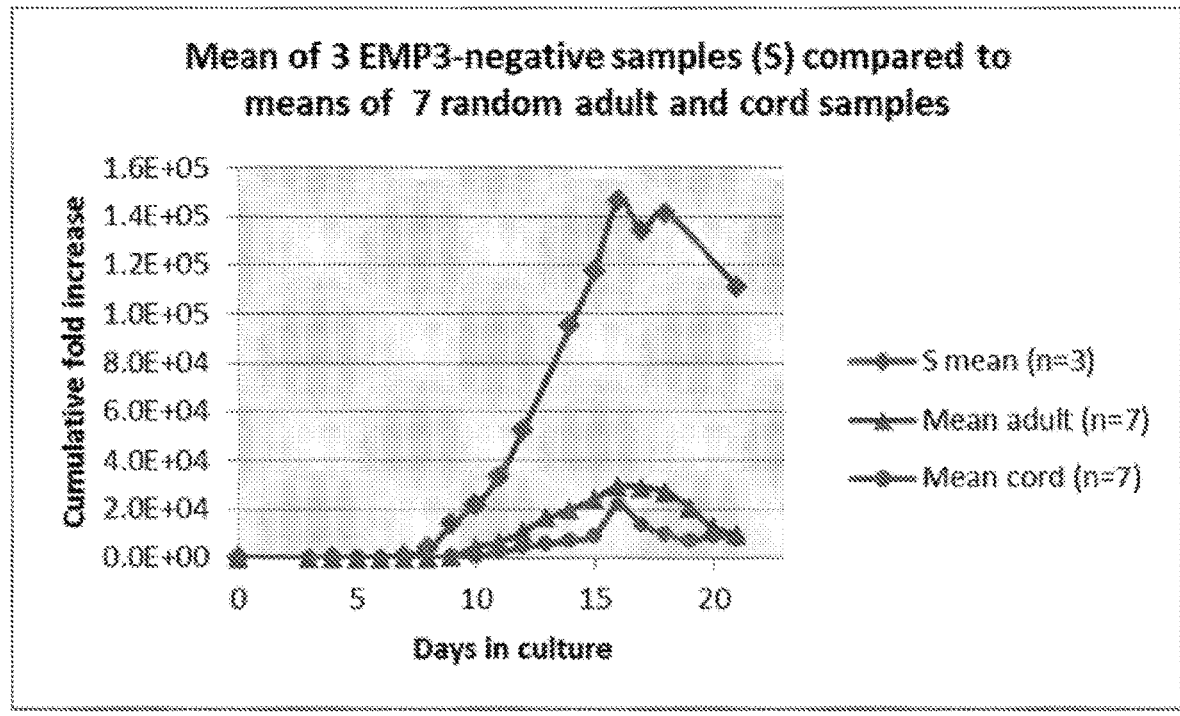
FIG. 2—Proliferation of EMP3-negative samples compared to random samples (7 adult and 7 cord samples) from different experiments. CD34+ cells obtained from EMP3-negative individuals (51 and S2) were cultured in three independent experiments (S1-1, S1-2 and S2). The mean cell proliferation over 21 days is shown (S mean) and compared to the mean cell proliferation obtained by culturing CD34+ cells obtained from 7 random samples of peripheral blood of adults (Mean adult) and cord blood (Mean cord).

When the EMP3-negative cell proliferation profiles were compared to seven random adult and seven random cord samples from different experiments, the improvement was still striking (FIG. 2). It is important to note that culture medium used in the experiments followed the original three-stage protocol. Since then, the protocol was optimised and the concentrations of cytokines adjusted, so the current three-stage protocol provides better proliferation, routinely enabling $>10^5$-fold amplification.

Figure 3:
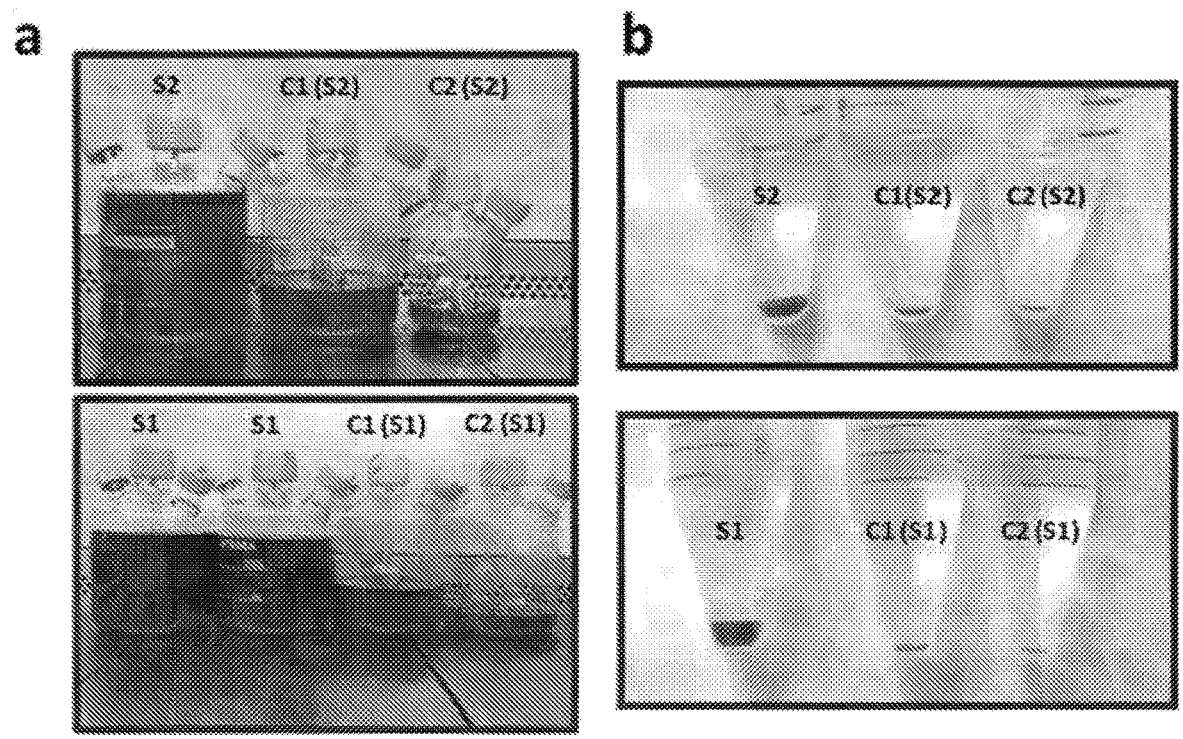
FIG. 3—Day 21 of cultures; (a) final volumes in spinner flasks prior to filtration, (b) packed reticulocytes post filtration. S1, S2 are EMP3-negative samples with matched controls C1(S1), C2(S1) and C1(S2), C2(S2), respectively.

On day 21 of culture, cells were filtered through leucocyte filters in order to remove free nuclei, early reticulocytes, and erythroblasts; leaving >98% pure population of cultured reticulocytes. As medium volumes were adjusted throughout the culture period to maintain cell density, markedly different final volumes were obtained at the end of the culture (FIG. 3). No significant differences in the erythroid cell types were observed between EMP3-negative and matched controls on cytospin preparations, suggesting that the prevalence of each cell type remained constant between the cultures. Therefore, the enhanced cell proliferation in EMP3-negative samples was not the result of imbalanced or altered erythroid differentiation.

The observations strongly suggested that EMP3 acts as a suppressor of proliferation in normal erythropoiesis and the lack of it improves ex vivo erythroid proliferation.

Example 3—Silencing EMP3 Gene in Immortalised Erythroid Cell Line

A BEL-A2 immortalised erythroid cell line was generated in the same manner as the BEL-A cell line (described in Trakarnsanga, K. et al 2017. Nature communications, 8, p.

14750). Adult bone marrow CD34+ cells were transduced with an HPV16-E6/E7 construct and maintained in primary medium for 4 days. On day 5 cells were transferred to expression media containing doxycycline to induce expression of E6 and E7 and maintained in the same medium thereafter.

The BEL-A2 immortalised erythroid cell line was utilised as a model for silencing the EMP3 gene. Native BEL-A2 was confirmed to express EMP3 by confocal microscopy and flow cytometry. Initially, targeted shRNA lentiviral transduction was used to knock-down the expression of EMP3. Lentiviral vector was produced in HEK293T cells (Takara Bio Europe, Paris, France), which were seeded at $8\times10^6$ per flask prior to transfection with 15 μg psPAX2 (packaging plasmid), 5 μg pMDG2 (envelope plasmid) and 20 μg shRNA plasmid (GeneCopoeia Inc, Maryland, USA) using Polyethylenimine (PEI). EMP3 clone set #HSH004823-LVRU6GP or scrambled control #CSHCTR001-1-LVRU6GP were used. The PEI/DNA complexes were incubated with the cells at 37° C. for 4 hours, and then replaced with fresh medium. Viral supernatants were harvested after 48 and 72 hours, pooled, filtered and concentrated using Lenti-X Concentrator (Takara Bio Europe). Viral pellets were resuspended in 1.5 ml StemSpan SFEM (STEMCELL Technologies, Cambridge, UK), aliquoted and stored at −80° C.

Figure 4:
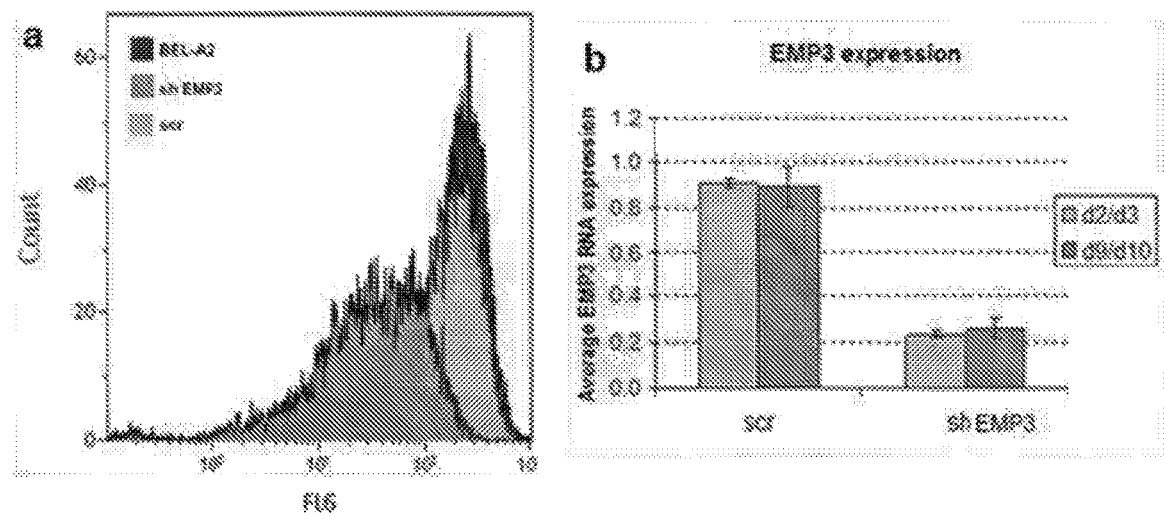
FIG. 4—EMP3 knock-down in BEL-A2 erythroid cell line as shown by (A) flow cytometry and (B) QPCR. EMP3 silenced cells (sh EMP3) were tested in parallel with scrambled control (scr).

BEL-A2 cells were maintained in culture during the lentiviral preparation. Aliquots of $1\times10^6$ BEL-A2 cells were transduced with 0.25-0.5 ml concentrated virus in the presence of 8 μg/ml polybrene for 1 hour, followed by addition of 5 ml of expansion medium. After 48 hours, cells were washed in Hanks' Balanced Salt Solution (Sigma-Aldrich, Poole, UK) and seeded in fresh expansion medium. Initial samples were taken for flow cytometry to assess transduction efficiency (GFP expression) and then cells were selected with puromycin (0.5 μg/ml) for at least 48 hours. Expression of the EMP3 was assessed by flow cytometry 9 or more days post-transduction (FIG. 4A) and the knock-down of the gene was verified by QPCR with total RNA extracted from transduced cells stored in RNAlater (Fisher Scientific, Loughborough, UK) after 2/3 days and 9/10 days (FIG. 4B).

Figure 5:
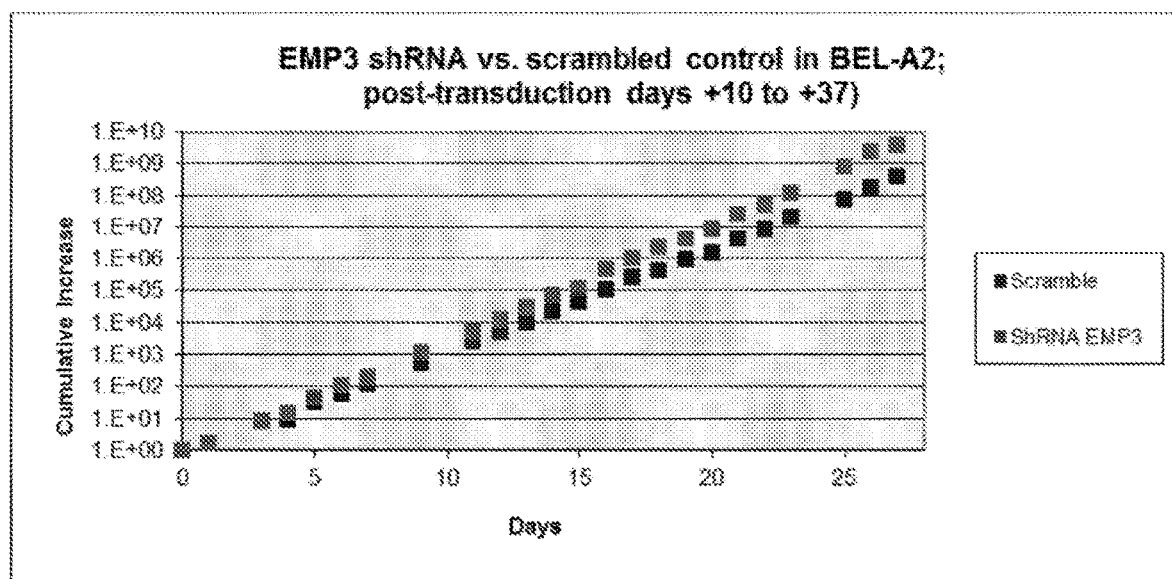
FIG. 5—Expansion rates of EMP3 silenced BEL-A2 cells (EMP3 shRNA cells) compared to scrambled control BEL-A2 cells, shown through cumulative fold increase.

Native BEL-A2 cells were maintained in culture for 26 days during the transduction experiments and their doubling time was 23.5 hours. Whilst maintained at the same cell density, scrambled control BEL-A2 cells retained the same doubling time, and EMP3 silenced BEL-A2 cells (EMP3 shRNA cells) showed improved doubling time of 21 h, as can be seen in FIG. 5. It should be noted that the FIG. 5 is on a logarithmic scale and the cumulative increase with the EMP3 knock-down was 10-fold higher than the control. This corresponds with the results for culturing hematopoietic cells from EMP3-negative individuals.

With a 10-fold increase, the use of current optimised culture condition would theoretically improve the yields of erythroid cells in in vitro cultures from $\sim10^{10}$ to $\sim10^{11}$ cells. Such manufactured red cells could be used for therapeutic approach, e.g. for multiply transfused patients and patients with rare phenotypes, and also for diagnostic purposes in control red cell panels for serology.

All publications mentioned in the above specification are herein incorporated by reference. Various modifications and variations of the disclosed methods, cells, compositions and uses of the invention will be apparent to the skilled person without departing from the scope and spirit of the invention. Although the invention has been disclosed in connection with specific preferred embodiments, it should be understood that the invention as claimed should not be unduly limited to such specific embodiments. Indeed, various modifications of the disclosed modes for carrying out the invention, which are obvious to the skilled person are intended to be within the scope of the following claims.

The invention claimed is:

1. An in vitro method for producing enucleated erythroid cells comprising culturing erythroid-producer cells which: (i) are obtained from an Epithelial membrane protein 3 (EMP3)-negative individual, wherein the EMP3-negative individual has erythrocytes with membrane surfaces that are devoid of EMP3 protein and/or no detectable EMP3 protein on their erythrocyte membrane surfaces, and/or (ii) have reduced expression of EMP 3 transcripts and/or EMP3 protein, wherein the erythroid-producer cells are modified to reduce expression of EMP3, wherein the modification reduces expression of EMP 3 transcripts and/or EMP3 protein.

2. A method for producing enucleated erythroid cells comprising the steps of:
(i) identifying an Epithelial membrane protein 3 (EMP3)-negative individual, wherein the EMP3-negative individual has erythrocytes with membrane surfaces that are devoid of EMP3 protein and/or no detectable EMP3 protein on their erythrocyte membrane surfaces;
(ii) obtaining erythroid-producer cells from said EMP3-negative individual; and
(iii) culturing said erythroid-producer cells.

3. A method for producing enucleated erythroid cells comprising the steps of:
(i) obtaining erythroid-producer cells;
(ii) modifying said erythroid-producer cells to reduce expression of Epithelial membrane protein 3 (EMP3) transcripts and/or EMP3 protein; and
(iii) culturing said erythroid-producer cells.

4. The method of claim 1, wherein the erythroid-producer cells are one or more of the group consisting of: hematopoietic stem cells, hematopoietic progenitor cells, induced pluripotent stem cells and immortalized erythroid cells.

5. The method of claim 1, wherein the erythroid-producer cells are hematopoietic stem cells and/or hematopoietic progenitor cells, optionally wherein the hematopoietic stem cells and/or hematopoietic progenitor cells are obtained from peripheral blood, umbilical cord blood or bone marrow, optionally wherein the erythroid-producer cells express surface antigen CD34.

6. The method of claim 1, wherein the erythroid-producer cells are induced pluripotent stem cells, optionally wherein the erythroid-producer cells express surface antigen CD34.

7. The method of claim 1, wherein the erythroid-producer cells are immortalized erythroid cells.

8. The method of claim 1, wherein the erythroid-producer cells are human erythroid-producer cells.

9. The method of claim 1, further comprising the steps of inducing enucleation of the erythroid cells and/or purifying the erythroid cells.

10. The method of claim 1, wherein the EMP3-negative individual lacks the EMP3 gene.

11. The method of claim 1, wherein the expression of EMP3 is reduced compared to unmodified erythroid-producer cells, optionally wherein the expression of EMP3 is reduced by at least 10%, 20%, 30%, 40% or 50% compared to the unmodified erythroid-producer cells.

12. The method of claim 1, wherein the yield of enucleated erythroid cells is increased by at least 2, 3, 4 or 5 times compared to a method comprising culturing: (i) erythroid-producer cells obtainable from EMP3-positive individuals; and/or (ii) erythroid-producer cells without reduced expression of EMP3 transcripts and/or EMP3 protein.

13. A blood transfusion pack comprising the enucleated erythroid cells prepared according to the method of claim 1.

14. A method of treating a human patient comprising transfusing the patient with the blood transfusion pack of claim 13.

15. A blood transfusion pack comprising a composition comprising enucleated erythroid cells prepared according to the method of claim 1 and a pharmaceutically acceptable carrier, diluent or excipient.

16. A method of treating a human patient comprising transfusing the patient with the blood transfusion pack of claim 15.

* * * * *

SEQUENCE LISTING

```
<160> NUMBER OF SEQ ID NOS: 5

<210> SEQ ID NO 1
<211> LENGTH: 163
<212> TYPE: PRT
<213> ORGANISM: Homo sapiens

<400> SEQUENCE: 1

Met Ser Leu Leu Leu Leu Val Val Ser Ala Leu His Ile Leu Ile Leu
1               5                   10                  15

Ile Leu Leu Phe Val Ala Thr Leu Asp Lys Ser Trp Trp Thr Leu Pro
            20                  25                  30

Gly Lys Glu Ser Leu Asn Leu Trp Tyr Asp Cys Thr Trp Asn Asn Asp
        35                  40                  45

Thr Lys Thr Trp Ala Cys Ser Asn Val Ser Glu Asn Gly Trp Leu Lys
    50                  55                  60

Ala Val Gln Val Leu Met Val Leu Ser Leu Ile Leu Cys Cys Leu Ser
65                  70                  75                  80

Phe Ile Leu Phe Met Phe Gln Leu Tyr Thr Met Arg Arg Gly Gly Leu
                85                  90                  95

Phe Tyr Ala Thr Gly Leu Cys Gln Leu Cys Thr Ser Val Ala Val Phe
            100                 105                 110

Thr Gly Ala Leu Ile Tyr Ala Ile His Ala Glu Glu Ile Leu Glu Lys
        115                 120                 125
```

```
His Pro Arg Gly Gly Ser Phe Gly Tyr Cys Phe Ala Leu Ala Trp Val
        130                 135                 140

Ala Phe Pro Leu Ala Leu Val Ser Gly Ile Ile Tyr Ile His Leu Arg
145                 150                 155                 160

Lys Arg Glu

<210> SEQ ID NO 2
<211> LENGTH: 163
<212> TYPE: PRT
<213> ORGANISM: Homo sapiens

<400> SEQUENCE: 2

Met Ser Leu Leu Leu Leu Val Val Ser Ala Leu His Ile Leu Ile Leu
1               5                   10                  15

Ile Leu Leu Phe Val Ala Thr Leu Asp Lys Ser Trp Trp Thr Leu Pro
                20                  25                  30

Gly Lys Glu Ser Leu Asn Leu Trp Tyr Asp Cys Thr Trp Asn Asn Asp
            35                  40                  45

Thr Lys Thr Trp Ala Cys Ser Asn Val Ser Glu Asn Gly Trp Leu Lys
    50                  55                  60

Ala Val Gln Val Leu Met Val Leu Ser Leu Ile Leu Cys Cys Leu Ser
65                  70                  75                  80

Phe Ile Leu Phe Met Phe Gln Leu Tyr Thr Met Arg Arg Gly Gly Leu
                85                  90                  95

Phe Tyr Ala Thr Gly Leu Cys Gln Leu Cys Thr Ser Val Ala Val Phe
            100                 105                 110

Thr Gly Ala Leu Ile Tyr Ala Ile His Ala Glu Ile Leu Glu Lys
    115                 120                 125

His Pro Arg Gly Gly Ser Phe Gly Tyr Cys Phe Ala Leu Ala Trp Val
        130                 135                 140

Ala Phe Pro Leu Ala Leu Val Ser Gly Ile Ile Tyr Ile His Leu Arg
145                 150                 155                 160

Lys Arg Asp

<210> SEQ ID NO 3
<211> LENGTH: 489
<212> TYPE: DNA
<213> ORGANISM: Homo sapiens

<400> SEQUENCE: 3
atgagcctgc tgctgctggt ggtgagcgcg ctgcatattc tgattctgat tctgctgttt      60
gtggcgaccc tggataaaag ctggtggacc ctgccgggca agaaagcct gaacctgtgg      120 tatgattgca cctggaacaa cgataccaaa acctgggcgt gcagcaacgt gagcgaaaac      180
ggctggctga aagcggtgca ggtgctgatg gtgctgagcc tgattctgtg ctgcctgagc      240
tttattctgt ttatgtttca gctgtatacc atgcgccgcg gcggcctgtt ttatgcgacc      300
ggcctgtgcc agctgtgcac cagcgtggcg gtgtttaccg gcgcgctgat ttatgcgatt      360
catgcggaag aaattctgga aaaacatccg cgcggcggca gctttggcta ttgctttgcg      420
ctggcgtggg tggcgtttcc gctggcgctg gtgagcggca ttatttatat tcatctgcgc      480
aaacgcgaa                                                              489

<210> SEQ ID NO 4
<211> LENGTH: 21
<212> TYPE: DNA
<213> ORGANISM: Artificial Sequence
```

```
<220> FEATURE:
<223> OTHER INFORMATION: shRNA (short hairpin RNA): target sequence sh4

<400> SEQUENCE: 4
atcctcattc ttatactgct t                                          21

<210> SEQ ID NO 5
<211> LENGTH: 19
<212> TYPE: DNA
<213> ORGANISM: Artificial Sequence
<220> FEATURE:
<223> OTHER INFORMATION: scrambled control: target sequence

<400> SEQUENCE: 5
gcttcgcgcc gtagtctta                                             19
```